US010558398B2

(12) United States Patent
Gomez et al.

(10) Patent No.: US 10,558,398 B2
(45) Date of Patent: Feb. 11, 2020

(54) REDUCING READ LATENCY

(71) Applicant: SEAGATE TECHNOLOGY LLC, Cupertino, CA (US)

(72) Inventors: Kevin A. Gomez, Eden Prairie, MN (US); Mark Ish, Castro Valley, CA (US); David S. Ebsen, Minnetonka, MN (US); Daniel J. Benjamin, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/224,428

(22) Filed: Jul. 29, 2016

(65) Prior Publication Data

US 2018/0032264 A1 Feb. 1, 2018

(51) Int. Cl.
*G06F 3/06* (2006.01)

(52) U.S. Cl.
CPC .......... *G06F 3/0683* (2013.01); *G06F 3/065* (2013.01)

(58) Field of Classification Search
None
See application file for complete search history.

(56) References Cited

U.S. PATENT DOCUMENTS

| 8,677,203 | B1* | 3/2014 | Shalvi | G06F 11/14 714/723 |
| 9,348,752 | B1* | 5/2016 | Parakh | G06F 12/0802 |
| 2007/0198768 | A1* | 8/2007 | Kim | G11C 16/32 711/103 |
| 2007/0239926 | A1* | 10/2007 | Gyl | G11C 7/1075 711/103 |
| 2013/0132652 | A1* | 5/2013 | Wood | G06F 12/0246 711/103 |
| 2013/0198451 | A1* | 8/2013 | Hyun | G06F 3/0652 711/114 |
| 2014/0157085 | A1 | 6/2014 | Shalvi et al. | |
| 2015/0019918 | A1 | 1/2015 | Li | |
| 2015/0082124 | A1 | 3/2015 | Tang et al. | |
| 2016/0313946 | A1* | 10/2016 | Zang | G06F 3/0659 |

* cited by examiner

*Primary Examiner* — Tracy C. Chan
(74) *Attorney, Agent, or Firm* — Hall Estill Attorneys at Law

(57) ABSTRACT

Systems and methods for reducing read latency by storing a redundant copy of data are described. In one embodiment, the systems and methods include identifying data assigned to be written to a page of a storage device, storing the data in a page of a first die of the storage device, and saving at least one codeword from the data to a page of a second die. In some embodiments, the first die is associated with a first channel of the storage device and the second die is associated with a second channel of the storage device.

15 Claims, 7 Drawing Sheets

REDUCING READ LATENCY

SUMMARY

The present disclosure is directed to methods and systems for reducing read latency by storing a redundant copy of data. In some embodiments, the present systems and methods may write data to a first location on a storage device and save at least a portion of this data to a second location. Read redundancy may be reduced by reading the portion of data written to the second location when an operation temporarily blocks access to the first location.

A storage device for reducing read latency by storing a redundant copy of data is described. In one embodiment, the storage device may include a storage controller. In some embodiments, the storage controller may be configured to identify data assigned to be written to a page of a storage device, store the data in a page of a first die of the storage device, and save at least one codeword from the data to a page of a second die.

In some embodiments, the storage controller may be configured to map a logical block address associated with the data to both the page of the first die and the page of the second die. In some cases, the first die may be associated with a first channel of the storage device and the second die may be associated with a second channel of the storage device different from the first channel. In some cases, the first and second die may be associated with the same communication channel.

In some embodiments, the storage controller may be configured to categorize the data as hot data or cold data. In some cases, the data may be categorized based on at least one of a priority associated with the data, a frequency of access associated with the data, and a data format associated with the data. In some embodiments, the storage controller may be configured to copy the at least one codeword from the data to the page of the second die upon categorizing the data as hot data and bypass copying the at least one codeword from the data to the page of the second die upon categorizing the data as cold data.

In some embodiments, the storage controller may be configured to identify a first read request, the first read request comprising a request to read the data from the page of the first die and determine whether the first die is currently processing a first operation. In some cases, the first operation may include at least one of a write operation and erase operation. Upon determining the first die is not currently busy, the storage controller may read all of the data from the page of the first die.

On the other hand, upon determining the operation of the first die is currently busy processing the first operation, the storage controller may initiate suspension of the first operation, issue a second read request to read the at least one codeword from the page of the second die, and determine whether the second die is currently busy processing a second operation. In some cases, the second operation may include at least one of a read operation, write operation, and erase operation Upon determining the second die is currently busy processing the second operation, the storage controller may read the data from the page of the first die upon suspending the first operation. Conversely, upon determining the second die is not currently busy, the storage controller may read the at least one codeword from the page of the second die and transfer the at least one codeword to a buffer, read the data from the page of the first die upon suspending the first operation and transfer the data read from the first die, minus the at least one codeword, to the buffer, and combine the data read from the page of the first die, minus the at least one codeword, with the at least one codeword read from the page of the second die.

An apparatus for reducing read latency by storing a redundant copy of data is also described. In one embodiment, the apparatus may include a processor, memory in electronic communication with the processor, and instructions stored in the memory, the instructions being executable by the processor to perform the steps of identifying data assigned to be written to a page of a storage device, storing the data in a page of a first die of the storage device, and saving at least one codeword from the data to a page of a second die. In some cases, the first die may be associated with a first channel of the storage device and the second die may be associated with a second channel of the storage device.

A method for reducing read latency by storing a redundant copy of data is also described. In one embodiment, the method may include identifying data assigned to be written to a page of a storage device, storing the data in a page of a first die of the storage device, and saving at least one codeword from the data to a page of a second die. In some cases, the first die may be associated with a first channel of the storage device and the second die may be associated with a second channel of the storage device The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
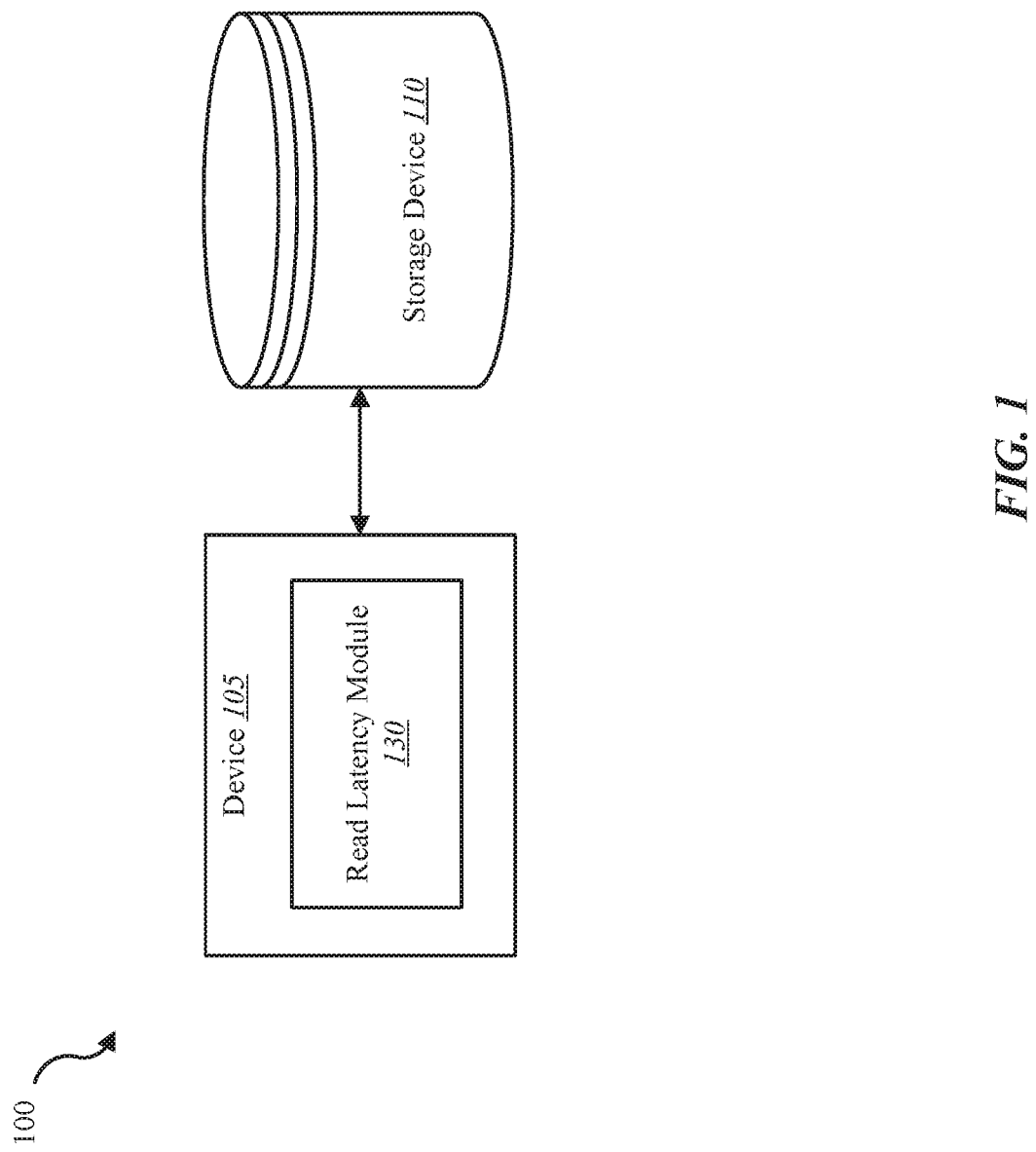
FIG. 1 is a block diagram of an example of a system in accordance with various embodiments.

The following relates generally to reducing read latency by storing a redundant copy of data. Read latency and its consistency is a critical performance requirement for storage drives such as solid state drives and the like. Some read latencies may be caused by die-contention where reads to a target die are blocked by activity in progress such as a write operation, erase operation, or competing read operation on the target die.

Storing the data in multiple locations on the storage drive such as on a separate die and/or flash memory on a separate channel may reduce the collision probability. Channels may refer to communication channels on a storage device. A channel may refer to the number of flash chips the controller can talk to simultaneously. Some storage drives may have 2 or 4 channels while others, such as enterprise storage drives, may have 8 or 10 channels, etc. A limitation on more channels is added die size, pin count and power consumption, which all increase the cost of the storage drive.

However, duplicating all the data may introduce significant overhead. In one embodiment, only hot data may be duplicated to a second location while cold data is written to a single location. Hot and cold data may be categorized based on types of data, data formats, frequency of access of the data, a priority of a process or command associated with the data, and so forth.

Additionally, or alternatively, in some embodiments, only a portion of the data may be duplicated to a second location. For instance, at least one codeword from the data may be duplicated to the second location. As one example, data that is 32 KB in size may be written to a first location. Each codeword of this data may be 1 KB in size. Thus, in conjunction with writing the 32 KB of data to the first location, at least codeword, or 1 KB, of this data may be written to a second location. In one embodiment, the first one or more codewords may be duplicated to the second location. Alternatively, the last one or more codewords of the data may be duplicated to the second location. In some cases, first, last, and/or middle codewords may be duplicated to the second location.

Writing data to a first die and duplicating at least a portion of this data to a second die may allow a read access of this data to proceed while the first die is blocked or paused by an operation (e.g., write, erase, read, etc.). For example, on a read access to the primary location (e.g., first die), if the first die is busy with another operation, the systems and methods may initiate a write/erase suspend on the first die and issue a read request to the secondary location (e.g., second die). If the secondary location is also blocked, the systems and methods may proceed with reading all of the data from the primary location. If the second location is not busy with another operation, the systems and methods may read the portion of the data stored at the secondary location, read the remaining portion from the primary location, then combine the data from the primary location with the data from the secondary location.

When writing to a solid state drive, writes occur by increments of the drive's page size. The page size of some drives may be configured at 2 KB, 4 KB, 8 KB or 16 KB, etc. Regardless of whether the data to be written to a page will fill a page, the entire page will be written to. For example, a write operation may include writing a single byte. Any remaining space may be filled in with zeroes, for example. Thus, if the page size is 2 KB and the portion of the data duplicated to the second location is also 2 KB in size, then the portion of data may be written directly to the 2 KB page without waiting for further data to be written to the page. On the other hand, if the page size for a particular drive is 16 KB, the data to be written is 32 KB in size, and the portion of the data duplicated to the second location is 2 KB in size, then the 32 KBs of data are written to two 16 KB pages of a first die and 2 KB of the 32 KBs are written to a page of a second die. However, since the page of the second die can hold 16 KB of data, writing 2 KB to this page would leave 14 KB of the page filled with zeroes. Thus, in some embodiments, if the portion of the data written to the second location is less than the page size of the drive, the duplicated portion may be stored in a buffer until a full page-worth of data is ready to be written to the page of the second die. Thus, in some embodiments, the portion of the data duplicated to the second die may be combined with other non-related data in a page (e.g., the duplicated data may be combined in a page with new data or a modification to data already stored on the drive, etc.).

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. In some embodiments, the systems and methods described herein may be performed on a single device (e.g., device 105). In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, etc. In some configurations, device 105 may include a read latency module 130. In one example, the device 105 may be coupled to storage device 110. In some embodiments, device 105 and storage device 110 may be components of flash memory or a solid state drive. Alternatively, device 105 may be a component of a host (e.g., operating system, host hardware system, etc.) of the storage device 110.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, etc. In one example, device 105 may be operable to receive data streams, store and/or process data, and/or transmit data from, to, or in conjunction with one or more local and/or remote computing devices.

The device 105 may include a database. In some cases, the database may be internal to device 105. For example, storage device 110 may include a database. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Read latency module 130 may be configured to store to a second location a copy of at least a portion of data written to a first location on the storage device 110 to reduce latency when reading this data from the first location.

Figure 2:
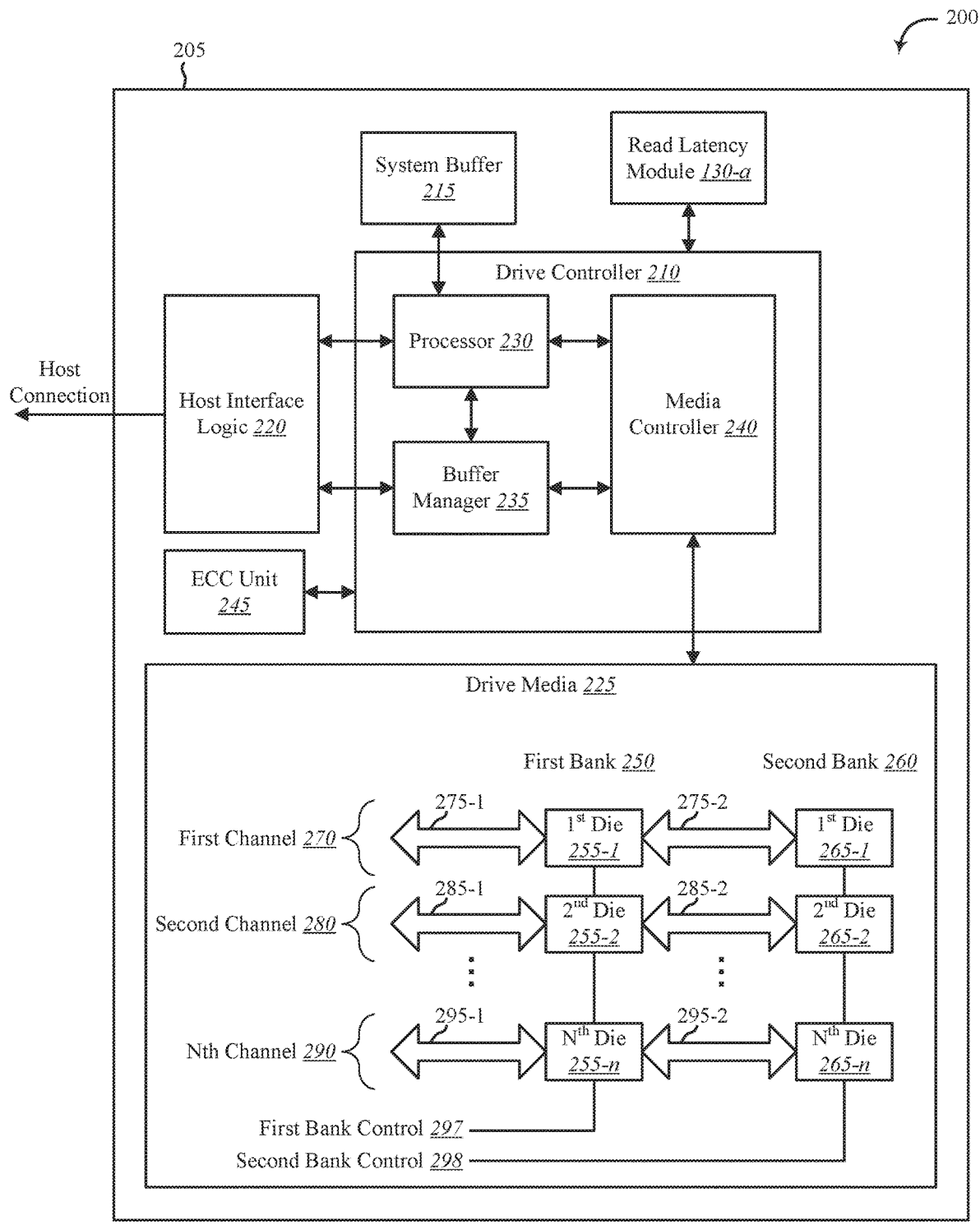
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, error correction code (ECC) unit 245, and read latency module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, etc.). ECC unit 245 may perform error correction in relation to a read operation. The drive buffer 215 may hold data temporarily for internal operations of apparatus 205. For example, a host may send data to apparatus 205 with a request to store the data on the drive media 225. The drive controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

As illustrated, drive media 225 may include multiple banks of flash memory dies as well as multiple communication channels to enable drive controller 210 to access the multiple banks of flash memory dies. For example, drive media 225 may include a first bank 250 of flash memory dies 255 and a second bank 260 of flash memory dies 265. The flash memory dies 255 of first bank 250 may be selected by drive controller 210 via first bank control 297. Likewise, flash memory dies 265 of second bank 260 may be selected by drive controller 210 via second bank control 298. Drive media 225 may also include first bus 275-1 and second bus 275-2 of first channel 270, first bus 285-1 and second bus 285-2 of second channel 280, and first bus 295-1 and second bus 295-2 of Nth channel 290.

Although depicted outside of drive controller 210, in some embodiments, read latency module 130-a may include software, firmware, and/or hardware located within drive controller 210. For example, read latency module 130-a may include at least portions of processor 230, buffer manager 235, and/or media controller 240. In one example, read latency module 130-a may include one or more instructions executed by processor 230, buffer manager 235, and/or media controller 240. The read latency module 130-a may be configured to store to a second location a copy of at least a portion of data written to a first location on the storage device 110 to reduce latency when reading this data from the first location. As one example, in conjunction with drive controller 210, read latency module 130-a may write data to $1^{st}$ die 255-1 by selecting first bank 250 via first bank control 297 and writing the data to $1^{st}$ die 255-1 over first bus 275-1 of first channel 270. In one embodiment, read latency module 130-a may write at least a portion of this same data to another flash memory die of drive media 225. As one example, read latency module 130-a may select second bank 260 via second bank control 298 and write the at least portion of data to $1^{st}$ die 265-1 of second bank 260 using second bus 275-2 of first channel 270 to transfer the data. Alternatively, read latency module 130-a may select first bank 250 via first bank control 297 and write the at least portion of data to $2^{nd}$ die 255-2 of first bank 250 using first bus 285-1 of second channel 280 to transfer the data.

Figure 3:
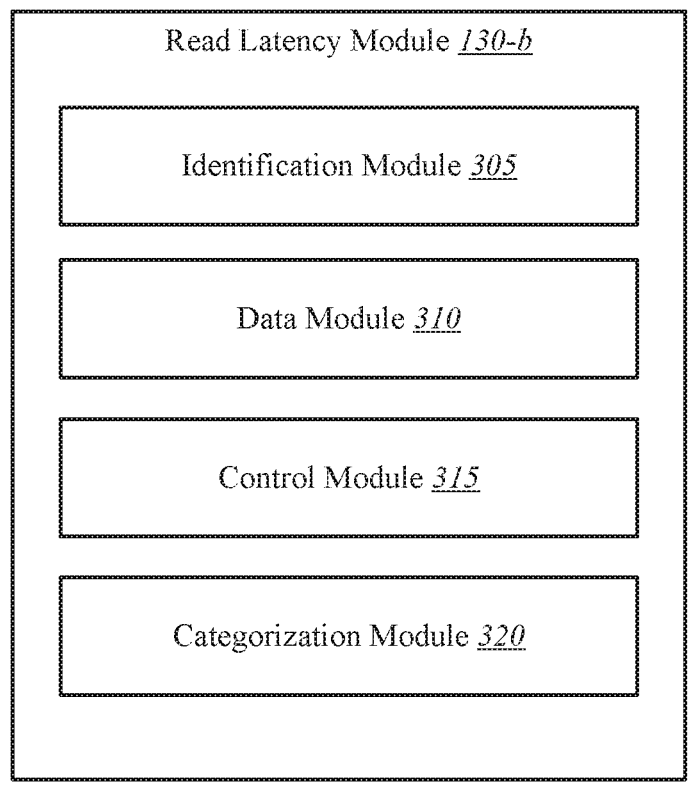
FIG. 3 shows a block diagram of one or more modules in accordance with various aspects of this disclosure.

FIG. 3 shows a block diagram 300 of a read latency module 130-b. The read latency module 130-b may include one or more processors, memory, and/or one or more storage devices. The read latency module 130-b may include identification module 305, data module 310, control module 315, and categorization module 320. The read latency module 130-b may be one example of read latency module 130 of FIGS. 1 and/or 2. Each of these components may be in communication with each other.

In one embodiment, identification module 305 may be configured to identify data assigned to be written to a page of a storage device. For example, identification module 305 may identify data received from a host of the storage device such as an operating system sending a command to the storage device to write data to a storage medium of the storage device. In some cases, the data being written may be associated with an update or rewrite of data already stored on the storage device.

In some embodiments, the storage device may include one or more dies of solid state flash memory. Accordingly, in some embodiments, data module 310 may be configured to write data to a page of a first die of the storage device. In some embodiments, data module 310 may be configured to save at least one codeword from the data written to the page of the first die to a page of a second die. For example, data module 310 may be configured to write to a second die a predetermined portion of data written to a first die. In one embodiment, the first die may be associated with a first communication channel or bus of the storage device and the second die being associated with a second communication channel of the storage device. Alternatively, in some embodiments, the first and second die may be associated with the same communication channel of the storage device.

In one embodiment, control module 315 may be configured to map a logical block address (LBA) associated with the data written to the first die and the portion of the data written to the second page. Control module 315 may store a mapping of the data and portion of data written to both the first and second dies. Conventionally, data written to a physical location may be mapped to an LBA seen by the host or operating system of the storage device. In one embodiment, the host may see a single LBA range where the data is virtually stored, while the control module 315 maps the data so that the storage device sees the physical locations of the data being stored in both the first die and second die.

In some embodiments, categorization module 320 may be configured to categorize data as hot data or cold data. In some cases, the data being categorized may be based on at least one of a priority associated with the data, a frequency of access associated with the data, and a data format associated with the data. For example, a host may request the storage device store data with a high priority and data with a default priority. Accordingly, categorization module 320 may identify data with a high priority and data with a default priority based on the write requests. In some cases, categorization module 320 may monitor the storage device to determine which data has a high frequency of access and which data has a low frequency of access. For example, a write operation may be associated with data already stored to the storage device and assigned to be rewritten to a different location on the storage device. Accordingly, based on monitoring, categorization module 320 may determine that certain data has a high frequency of access such as data with a number of accesses that satisfy a predetermined frequency of access threshold, and data with a low frequency of access such as data with no accesses or a number of accesses that fails to satisfy the predetermined frequency of access threshold. In some embodiments, categorization module 320 may monitor data accesses and associate an average number of accesses with types of data (e.g., text, documents, photos, video, audio, metadata, etc.). Based on this association, categorization module 320 may associate a first type of data with a high frequency of access and a second type of data with a low frequency of access.

In some embodiments, data module 310 may be configured to save at least a portion of data being written to a first die to a second data based on a priority or categorization associated with the data. For example, data module 310 may copy to a second die at least a portion of high priority data written to a first die and bypass copying to a second location data marked with a default priority. Thus, data module 310 may write default priority data to a first die only, write high priority data to a second die, and write at least a portion of the high priority data to a third die.

Similarly, in some embodiments, data module 310 may be configured to copy and/or save at least one codeword from data written to a page of a first die to a page of a second die based on the data being categorized by categorization module 320 as hot data. The at least one codeword exists in the system, thus data module 310 may save this data in at least two places. In one embodiment, the data module 310 may do a low-density parity-check (LDPC) encode operation on the at least one codeword and then save the at least one encoded codeword to two places. In some cases, data module 310 may first save the at least one encoded codeword to at least one place and then later save the at least one encoded codeword to one or more other places. As one example, the at least one encoded codeword may be saved in flash memory and data module 310 may read the at least one encoded codeword, decode the at least one encoded codeword, perform any correction as needed on the decoded data, re-encode the at least one codeword, and then save or write this at least one re-encoded codeword (a copy of the original at least one encoded codeword) to a second location such as a second channel.

In some embodiments, data module 310 may be configured to bypass copying the at least one codeword from the data to the page of the second die upon categorizing the data as cold data. As explained above, in one embodiment, data module 310 may write data to a page of a first die and at least a portion of this data to a page of a second die. In some embodiments, identification module 305 may be configured to identify a first read request for the data written to the first die. In some embodiments, control module 315 may be configured to determine whether the first die is currently processing any operations and/or has any pending operations. The operations of the first die may include write operations, read operation, erase operations, garbage collection operations, and the like.

In one embodiment, data module 310 may be configured to read the data written to the page of the first die upon determining the first die is not processing any operations. On the other hand, in some embodiments, control module 315 may determine that the first page is busy processing one or more operations. Accordingly, data module 310 may be configured to initiate a suspension of the one or more operations of the first die upon determining the first die is currently busy processing the one or more operations. In some cases the die may be busy doing an operation that is not suspendable such as a read operation. In some embodiments, data module 310 may determine whether the operation on the die is suspendable. For example, data module 310 may determine whether the operation is a read operation, write operation, or erase operation. If the data module 310 determines the operation is a read operation, data module 310 may wait for the read operation to finish. On the other hand, if the data module 310 determines the operation is a write and/or erase operation, the data module 310 may suspend the operation. In some cases, data module 310 may keep track of a suspend count for a given block. In some cases, data module 310 may suspend an operation as long as the suspend count for the given block does not exceed a predetermined value. In some embodiments, the suspend count may be reset at a predetermined rate such as once per day, once an hour, etc.

In some embodiments, control module 315 may be configured to determine whether at least a portion of the data of the read request is written to a second location. In the given example, control module 315 may determine that at least a portion of the data is copied to the page of the second die. Accordingly, control module 315 may be configured to issue, in relation to the first read request, a second read request to read the at least a portion of data copied to the second die. In some embodiments, based on the second read request, control module 315 may be configured to determine whether the second die is currently busy processing one or more operations.

When the control module 315 determines that the second die is currently busy processing one or more operations, data module 310 may wait for the data to become available at the first die. Thus, in some embodiments, data module 310 may be configured to read the data from the page of the first die once the operations of the first die are suspended.

When the control module 315 determines the second die is not busy processing an operation, in one embodiment, data module 310 may be configured to read the at least portion of data written to the page of the second die. If a complete copy of the data is written to the second die, data module 310 may read all of the data from the second die. In some embodiments, control module 315 may cancel the suspension of operations on the first die upon reading all the data from the second die. Alternatively, only a portion of data may be written to the second die. In this case, while waiting for operations of the first die to be suspended, data module 310 may read the portion of the data written to the second die. After suspending the operations to the first die, data module 310 may read the remaining data from the page of the first die, minus the portion read from the second die. In some embodiments, data module 310 may be configured to combine the data read from the page of the first die with the portion of the data read from the page of the second die. Accordingly, data module 310 may read the requested data with less delay than waiting for all of the data to be read from the first die only.

Figure 4:
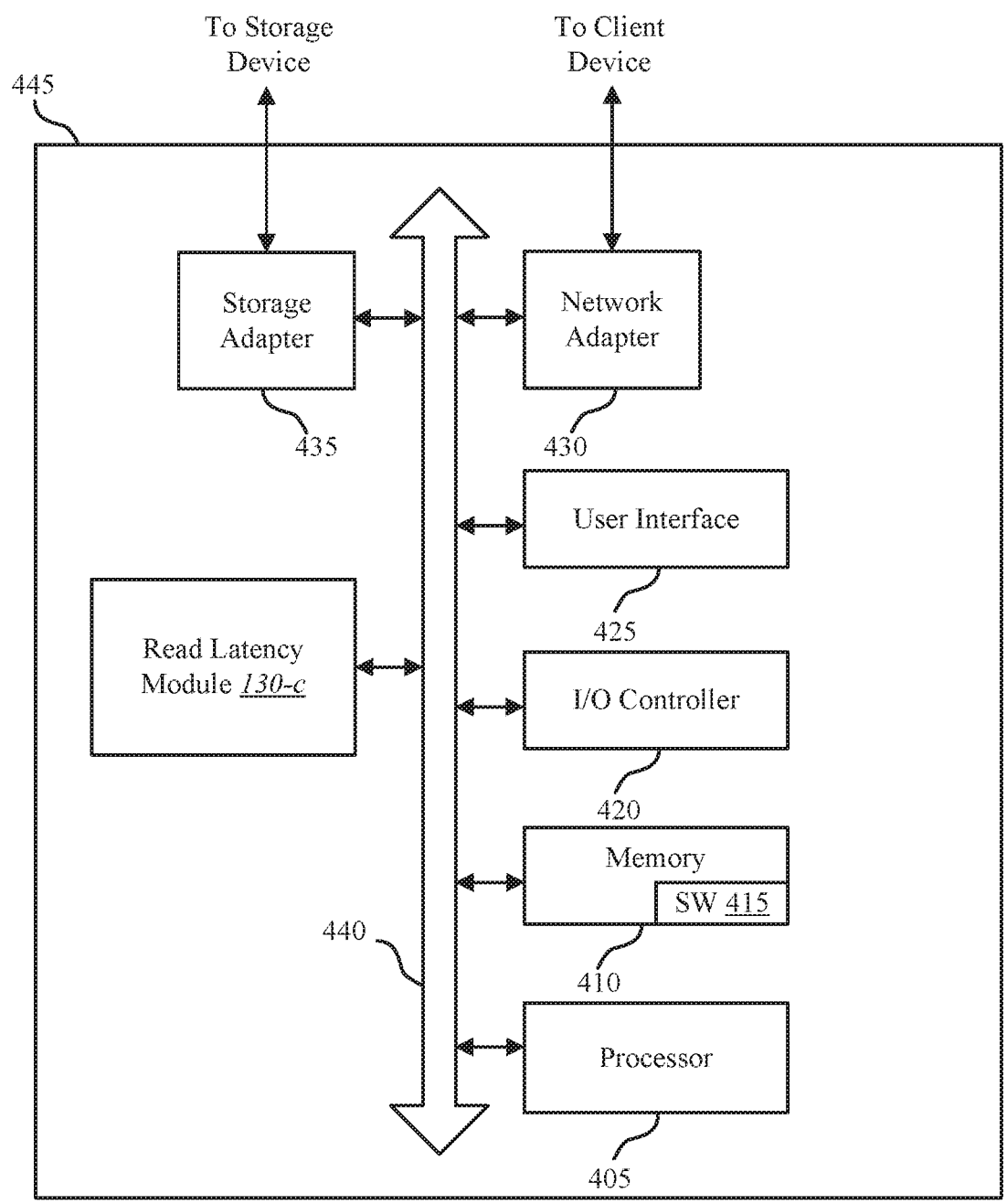
FIG. 4 shows a diagram of a system in accordance with various aspects of this disclosure.

FIG. 4 shows a system 400 for reducing read latency by storing a redundant copy of data, in accordance with various examples. System 400 may include an apparatus 445, which may be an example of any one of device 105 of FIG. 1 and/or apparatus 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a read latency module 130-c, which may perform the functions described above for the read latency module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 440 may allow data communication between one or more elements of apparatus 445 (e.g., processor module 405, memory 410, I/O controller module 420, user interface module 425, network adapter 430, and storage adapter 435, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. For example, at least a portion of the read latency module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or other devices over a network. Network adapter 430 may provide wired and/or wireless network connections. In some cases, network adapter 430 may include an Ethernet adapter or Fibre Channel adapter. Storage adapter 435 may enable apparatus 445 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
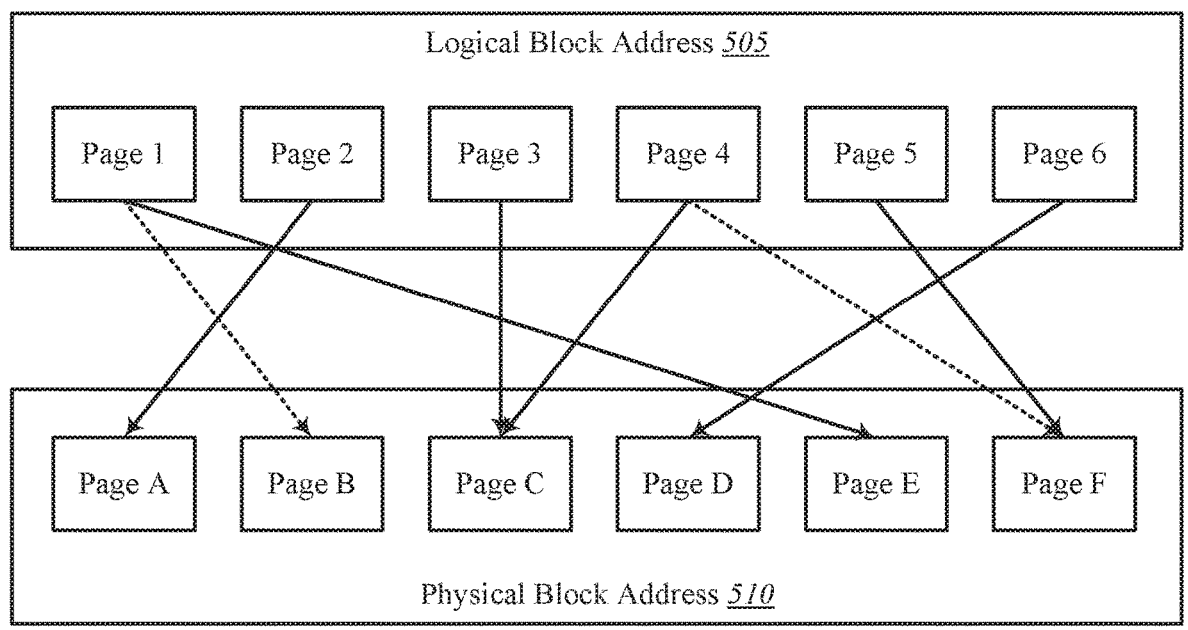
FIG. 5 shows one embodiment of an environment in accordance with various aspects of this disclosure.

FIG. 5 shows an environment 500 for reducing read latency by storing a redundant copy of data, in accordance with various examples. At least one aspect of environment 500 may be implemented in conjunction with device 105 of FIG. 1, apparatus 205 of FIG. 2, and/or read latency module 130 depicted in FIGS. 1, 2, 3, and/or 4.

As depicted, environment 500 shows a mapping between logical block addresses (LBAs) 505 and physical block addresses (PBAs) 510. As shown, LBA 505 may include multiple pages. As an example, pages 1-6 are shown in LBA 505. It is understood that LBA 505 may have more pages than is shown in FIG. 5. Also shown, PBA 510 may include multiple pages. Again, as an example, pages A-F are shown in PBA 510 and it is also understood that PBA 510 may have more pages than shown in FIG. 5. In one embodiment, pages A-F of PBA 510 represents the physical pages of flash memory dies in a storage device such as device 105 of FIG. 1, apparatus 205 of FIG. 2, and/or apparatus 445 of FIG. 4. For example, pages A-F of PBA 510 may represent the pages of $1^{st}$ die 255-1 or any other die of drive media 225. Additionally, pages 1-6 of LBA 505 represent the virtual pages of a host of the storage drive such as an operating system.

In one embodiment, if a host operating system saves data to a storage drive, the operating system may record that the data is stored in virtual page 1 of LBA 505. The data virtually stored in page 1 may have a virtual address range determined by the size of the data stored. In reality, the actual data may be stored, as illustrated, in physical page E of PBA 510 with a physical address range. Thus, when a host operating system detects a storage drive, the host operating system may detect the physically addressable range of the storage drive and create a virtual address range that the storage drive maps to the corresponding physical locations of the physical data on the drive. Accordingly, the storage drive may create a mapping between the logical pages of the host operating system and the physical pages of the storage drive.

As one example, if the data stored in page E were to be copied or rewritten to another physical page, such as page F, because of a refresh operation due to garbage collection or some other operation, then the physical data may be erased from page E and if operating system were to request the storage drive to access the corresponding virtual data stored in page 1, as illustrated, then the storage drive would indicate that no data exists at that physical location. Accordingly, when the storage drive moves data from one page to another, the storage drive updates the mapping between LBA 505 and PBA 510 to indicate the virtual data stored in virtual page 1 is now physically stored in page F. Thus, the physical locations of data stored on the storage drive may be updated without affecting the virtual addressing of the host operating system.

In one embodiment, read latency module 130 may write a file to physical page C of PBA 510. The read latency module 130 may map the data stored in physical page C to virtual page 4 of LBA 505. In some embodiments, read latency module 130 may store at least a portion of this same data stored in physical page C in another physical location such as page F of PBA 510. Accordingly, read latency module 130 may map the portion of data stored in physical page F also to virtual page 4 of LBA 505. Accordingly, when read latency module 130 receives a request to access the data stored physically in page C, read latency module 130 may first attempt the access the data stored in page C. If read latency module 130 determines that page C is currently blocked by another operations (e.g., write, read, erase, etc.), then read latency module 130 may suspend the operation of page C. Additionally, read latency module 130 may identify a copy of at least a portion of this same data is also stored in page F based on the mapping. Accordingly, read latency module 130 may attempt to read the at least portion of the data from page F. If read latency module 130 determines that page F is currently blocked by another operation, then read latency module 130 waits until the operation of page C is suspended and reads all of the data from page C. Conversely, if page F is not busy, then read latency module 130 reads the at least portion of data from page F then reads the remaining portion from page C and combines the two portions to obtain the complete data.

As illustrated, read latency module 130 may map data virtually stored in page 1 to the complete data stored physically in page E as well as a copy of at least a portion of this same data physically stored in page B. Also, read latency module 130 may map data virtually stored in page 2 to data physically stored in page A, data virtually stored in page 3 to data physically stored in page C, data virtually stored in page 5 to data physically stored in page F, and data virtually stored in page 6 to data physically stored in page D.

Figure 6:
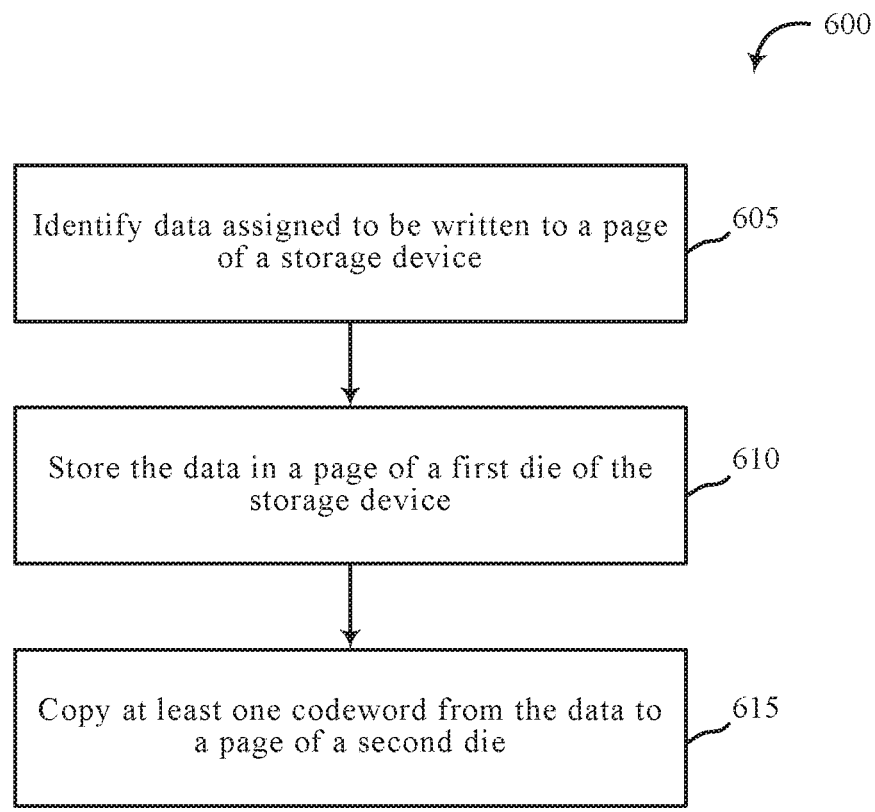
FIG. 6 is a flow chart illustrating an example of a method in accordance with various aspects of this disclosure.

FIG. 6 is a flow chart illustrating an example of a method 600 for reducing read latency by storing a redundant copy of data, in accordance with various aspects of the present disclosure. One or more aspects of the method 600 may be implemented in conjunction with device 105 of FIG. 1, apparatus 205 of FIG. 2, and/or read latency module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may identify data assigned to be written to a page of a storage device. At block 610, the method 600 may store the data in a page of a first die of the storage device. At block 615, the method 600 may save at least one codeword from the data to a page of a second die.

The operation(s) at block 605-615 may be performed using the read latency module 130 described with reference to FIGS. 1-4 and/or another module. Thus, the method 600 may provide for reducing read latency by storing a redundant copy of data relating to reducing read latency by storing a redundant copy of data. It should be noted that the method 600 is just one implementation and that the operations of the method 600 may be rearranged, omitted, and/or otherwise modified such that other implementations are possible and contemplated.

Figure 7:
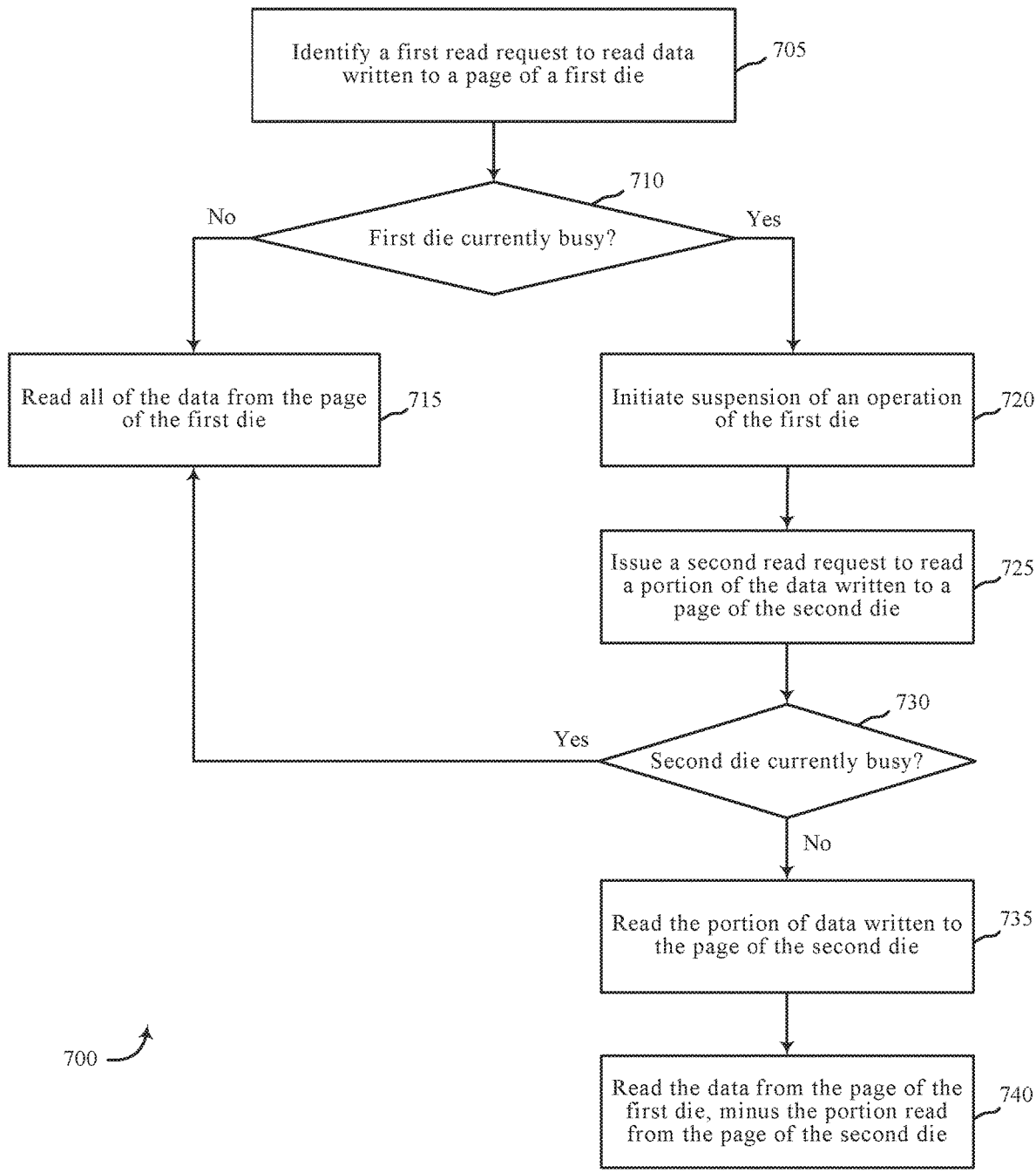
FIG. 7 is a flow chart illustrating an example of a method in accordance with various aspects of this disclosure.

FIG. 7 is a flow chart illustrating an example of a method 700 for reducing read latency by storing a redundant copy of data, in accordance with various aspects of the present disclosure. One or more aspects of the method 700 may be implemented in conjunction with device 105 of FIG. 1, apparatus 205 of FIG. 2, and/or read latency module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally, or alternatively, the backend server, computing device, and/or storage device may perform one or more of the functions described below using special-purpose hardware.

At block 705, the method 700 may identify a first read request to read data written to a page of a first die. In some embodiments, a complete copy of the data may be written to the page of the first die and a copy of at least a portion of this data may be written to a page of a second die. At block 710, the method 700 may determine whether the first die is currently busy processing one or more operations such as read, write, and/or erase operations. At block 715, upon determining the first die is not currently busy, the method 700 may read the data from the page of the first die without delay.

At block 720, upon determining the first die is currently busy processing one or more operations, the method 700 may initiate suspension of the one or more operations. At block 725, the method 700 may issue a second read request to read the portion of the data written to the page of the second die. At block 730, the method 700 may determine whether the second die is currently busy processing one or more operations.

Upon determining the second die is currently busy processing the second operation, at block 715, the method 700 may read the data from the page of the first die once the one or more operations of the first die are suspended. At block 735, upon determining the second die is not currently busy, the method 700 may read the portion of the data written to the page of the second die.

At block 740, once the one or more operations of the first die are suspended, the method 700 may read the data from the page of the first die minus the portion read from the second die. For example, if at block 735 the method 700 reads the first codeword of the data from the page of the second die, then at block 740 the method 700 may read all but the first codeword of the data from the page of the first die. In some embodiments, the method 700 may combine the data read from the page of the first die with the portion of the data read from the page of the second die.

The operations at blocks 705-740 may be performed using the read latency module 130 described with reference to FIGS. 1-4 and/or another module. Thus, the method 700 may provide for reducing read latency by storing a redundant copy of data relating to reducing read latency by storing a redundant copy of data. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage drive comprising a storage controller to:
   perform a write process of the storage drive, the write process including:
      identify data assigned to be written to a page of the storage drive;
      store the data in a page of a first die of the storage drive;
      copy a portion of the data to a page of a second die of the storage drive, the portion including a first n codewords from m codewords in the data, n and m being positive integers where n is less than m, the first die and the second die being from a first bank of dies from multiple banks of dies in the storage drive;
      identify a first read request requesting to read from the data stored in the page of the first die;
      upon identifying the first read request, determine whether the first die is currently processing a first operation;
      upon determining the first die is currently processing the first operation, determine an operation type of the first operation;
      upon determining the operation type of the first operation is either a write operation or an erase operation, initiate suspension of the first operation and issue a second read request to read the first n codewords from the page of the second die;
      upon determining the second die is not currently busy, read the first n codewords from the page of the second die and transfer the first n codewords to a buffer;
      read the data from the page of the first die upon suspending the first operation and transfer the data read from the first die, minus the first n codewords, to the buffer; and
      combine the data read from the page of the first die, minus the first n codewords, with the first n codewords read from the page of the second die.

2. The storage drive of claim 1, the storage controller to:
   map a logical block address associated with the data to both the page of the first die and the page of the second die.

3. The storage drive of claim 1, the first die being associated with a first channel of the storage drive and the second die being associated with a second channel of the storage drive.

4. The storage drive of claim 1, the storage controller to:
   categorize the data as hot data or cold data, the data being categorized based on at least one of a priority associated with the data, a frequency of access associated with the data, and a data format associated with the data.

5. The storage drive of claim 1, the storage controller to:
copy the first n codewords from the data to the page of the second die upon categorizing the data as hot data; and
bypass copying the first n codewords from the data to the page of the second die upon categorizing the data as cold data.

6. The storage drive of claim 1, the storage controller to:
upon determining the first die is not currently busy, read the data from the page of the first die.

7. The storage drive of claim 1, the storage controller to:
determine whether the second die is currently busy processing a second operation, the second operation comprising at least one of a read operation, write operation, and erase operation.

8. The storage drive of claim 7, the storage controller to:
upon determining the second die is currently busy processing the second operation, read the data from the page of the first die upon suspending the first operation or once the first operation finishes a read operation.

9. An apparatus comprising:
a storage controller to:
perform a write process of the apparatus, the write process including:
identify data assigned to be written to a page of the apparatus;
store the data in a page of a first die of the apparatus;
copy a portion of the data to a page of a second die of the apparatus, the portion including a first n codewords from m codewords in the data, n and m being positive integers where n is less than m, the first die and the second die being from a first bank of dies from multiple banks of dies in the apparatus;
identify a first read request requesting to read from the data stored in the page of the first die;
upon identifying the first read request, determine whether the first die is currently processing a first operation;
upon determining the first die is currently processing the first operation, determine an operation type of the first operation;
upon determining the operation type of the first operation is either a write operation or an erase operation, initiate suspension of the first operation and issue a second read request to read the first n codewords from the page of the second die;
upon determining the second die is not currently busy, read the first n codewords from the page of the second die and transfer the first n codewords to a buffer;
read the data from the page of the first die upon suspending the first operation and transfer the data read from the first die, minus the first n codewords, to the buffer; and
combine the data read from the page of the first die, minus the first n codewords, with the first n codewords read from the page of the second die.

10. The apparatus of claim 9, the storage controller to:
map a logical block address associated with the data to both the page of the first die and the page of the second die.

11. The apparatus of claim 9, the storage controller to:
copy the first n codewords from the data to the page of the second die upon categorizing the data as hot data; and
bypass copying the first n codewords from the data to the page of the second die upon categorizing the data as cold data.

12. The apparatus of claim 9, the storage controller to:
upon determining the first die is not currently busy, read the data from the page of the first die.

13. The apparatus of claim 9, the storage controller to:
determine whether the second die is currently busy processing a second operation, the second operation comprising at least one of a read operation, write operation, and erase operation;
upon determining the second die is currently busy processing the second operation, read the data from the page of the first die after suspending the first operation; and
upon determining the second die is not currently busy read the first n codewords from the page of the second die and, after suspending the first operation, read the data from the page of the first die minus the first n codewords.

14. A method comprising:
performing a write process of a storage drive, the write process including:
identifying data assigned to be written to a page of the storage drive;
storing the data in a page of a first die of the storage drive; and
copying a portion of the data to a page of a second die of the storage drive, the portion including a first n codewords from m codewords in the data, n and m being positive integers where n is less than m, the first die and the second die being from a first bank of dies from multiple banks of dies in the storage drive, the first die being associated with a first channel of the storage drive and the second die being associated with a second channel of the storage drive;
identifying a first read request requesting to read from the data stored in the page of the first die;
upon identifying the first read request, determining whether the first die is currently processing a first operation;
upon determining the first die is currently processing the first operation, determining an operation type of the first operation;
upon determining the operation type of the first operation is either a write operation or an erase operation, initiating suspension of the first operation and issuing a second read request to read the first n codewords from the page of the second die;
upon determining the second die is not currently busy, read the first n codewords from the page of the second die and transfer the first n codewords to a buffer;
read the data from the page of the first die upon suspending the first operation and transfer the data read from the first die, minus the first n codewords, to the buffer; and
combine the data read from the page of the first die, minus the first n codewords, with the first n codewords read from the page of the second die.

15. The method of claim 14, comprising:
mapping a logical block address associated with the data to both the page of the first die and the page of the second die.

* * * * *